UNITED STATES PATENT OFFICE.

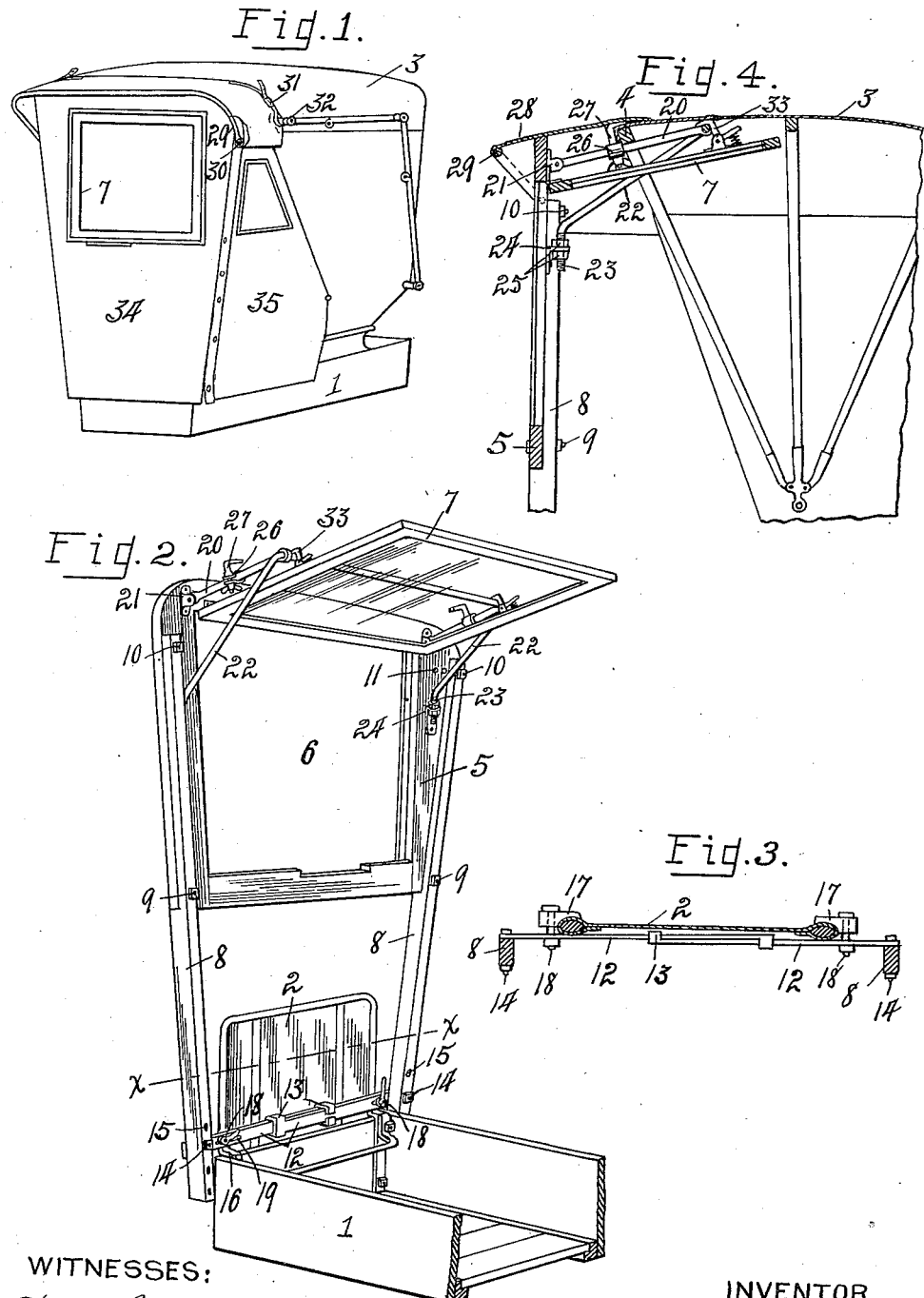

CHARLES F. WENSINGER, OF FREMONT, OHIO.

STORM-SHIELD FOR VEHICLES.

1,080,033.  Specification of Letters Patent.  Patented Dec. 2, 1913.

Application filed January 10, 1913. Serial No. 741,141.

*To all whom it may concern:*

Be it known that I, CHARLES F. WEN-SINGER, a citizen of the United States, and a resident of Fremont, in the county of Sandusky and State of Ohio, have invented a certain new and useful Storm-Shield for Vehicles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to storm shields for vehicles, and is particularly intended for use in connection with top buggies, but is not restricted to such use, as it may be used in any connection for which it may be adapted or appropriate.

The primary object of my invention is the provision of a simple and efficient shield of this character, which is capable of being easily and quickly applied to or removed from a vehicle and of being compactly folded, when not in use, for shipping or storing, and which, when in use, coöperates with the customary buggy top and side curtains to effectually exclude the rain, wind or snow.

A further object of my invention is the provision of improved means for supporting the frame of the shield, which means is easily adjustable to suit the varying widths of buggy bodies, thus adapting it for universal use on vehicles of this character without regard to the size of the bodies thereof.

A further object of the invention is the provision on a shield frame of the class described, of means which is adapted to adjustably coact with the front cross-rib of the buggy top, when raised, to brace the shield relative to the top, and also foldable in compact form against the shield to facilitate a storing or shipping of the same.

The invention is fully described in the following specification, and while, in its broader aspect, it is capable of embodiment in numerous forms, a preferred embodiment thereof is illustrated in the accompanying drawings, in which,—

Figure 1 is a perspective view of the body and raised top of a vehicle equipped with my invention. Fig. 2 is an enlarged perspective view of the storm shield frame embodying the invention mounted on a vehicle body, a portion of which is broken away, the window of the shield being in raised position. Fig. 3 is a cross-section taken on the line $x, x$ in Fig. 2, and Fig. 4 is an enlarged central vertical section of the upper portions of the shield, the top and the top extension-strip shown in Fig. 1, with the shield window raised.

Referring to the drawings, 1 designates a vehicle body having the customary dash 2 and top 3, the latter being of the folding type and having the usual cross-ribs 4 of any desired number, as is well understood in the art.

The wind shield comprising my invention embodies a window casing or frame 5 in the opening 6 on which is hung a window 7, which is preferably hinged at its upper edge to the frame to enable it to be swung rearward and upward when it is not desired to close the window frame opening, as shown in Figs. 2 and 4, the window being held in its raised position as hereinafter described. The frame 5 is supported in proper relation to the vehicle body and top by standards 8, 8, one of which is disposed at each side of the frame and extends from near the top thereof to a desired distance below the frame, being pivoted, as at 9, to the lower corner of the frame by a bolt or in any other suitable manner to enable the standard to have pivotal movements relative to the frame to place the lower ends thereof nearer or farther apart as the width of the vehicle body to which the frame is attached may require. The upper end portion of the standards 8 are disposed at the rear side of window frame and are rigidly secured thereto by bolts 10, each of which may be placed in any one of a series of apertures 11, provided in the respective side of the frame, to suit the adjustment of the standards on the pivots 9.

The lower ends of the standards 8, 8 are adjustably connected by a pair of cross-bars 12 which have their inner ends attached for relative longitudinal sliding adjustment, as shown at 13, and their outer ends attached to the lower end portions of the respective standards 8 by bolts 14, or in any other suitable manner. The bolts 14 provide a pivotal connection between the cross-bars and the standards, and may be inserted through any one of a series of vertically arranged apertures 15 provided therefor in the standards to suit the height at which it may be desired to support the frame 5 relative to the vehicle body. The cross-bars 12 are intended to rest upon the top edge of the vehicle body sides or upon the portions of the dash-frame irons which extend rearwardly over the front edge of the body, as shown at 16, and to be rigidly secured to the dash-frame by the coöperative action of clamping blocks 17 and bolts 18, as best shown in Fig. 3. The bolts 18 extend through longitudinally disposed slots 19 in the respective bars 12 to enable them to be adjusted longitudinally of the bars as the width of the dash may require.

When the shield is in erected position on a vehicle body, the horizontal space between the upper edge of the window frame 5 and the front edge of the vehicle top 3, when raised, varies with different makes or styles of vehicles, for in some the tops project farther forward than in others. To provide means for firmly connecting the upper portion of the shield to the front edge of the top 3 in a manner to firmly brace the shield relative to the top and at the same time to make such bracing means adjustable to suit the space between the top front and the shield, the shield frame 5 is provided at each side thereof adjacent to its top with a bracing arm 20, which is pivoted thereto for vertical swinging movements as through the medium of a wall bracket 21. The arms 20 are adjustably supported at any desired degree of inclination relative to the shield, in the present instance, by a U-shaped bracket member 22, which has its loop portion connecting the two arms 20 and journaled in suitable bearing openings provided in the outer ends thereof, and has the terminal portion of its legs bent, as shown at 23, to adapt them to project vertically through apertures (not shown) provided in the horizontally-projecting portions of brackets 24, which are secured to the sides of the shield frame 5 below the brackets 21. The bent portions 23 of the bracket legs are threaded to enable nuts 25 to be threaded thereon at opposite sides of the apertured portion of the bracket 24 to firmly retain the bracket 22 in adjusted position relative to the shield. The bracing arms 20 are intended to bear upward on an incline against the under side of the front cross-rib 4 of the vehicle top, and are held in firm contact therewith by a proper adjusting of the nuts 25 on the legs of the bracket 22, as is obvious by reference to Figs. 2 and 4. The upward inclining of the brace arms 20, as shown, causes them to coact with the front cross-rib 4 of the top in such manner as to prevent a forward tipping of the windshield relative to the top, but does not prevent a turning back of the top relative to the windshield, as the plane of inclination of the brace arms is not so decided as to prevent the cross-rib 4 from swinging freely over the rear ends thereof upon a turning back of the top. The shield is braced against rearward tilting movements relative to the top 3 by the provision on each arm 20 of a longitudinally adjustable clamp 26 carrying a bolt member 27 for abutment against the front edge of the cross-rib 4, such bolt preferably having its upper end of hooked form to adapt it to engage over the top edge of the rib, as shown in Fig. 4.

The space between the front edge of the top and the upper portion of the shield is closed by a top extension strip or hood 28, which is formed of any suitable material, preferably of a waterproof nature, and is of sufficient width for its rear edge to overlap the front edge portion of the top and for its front edge to project a short distance in advance of the shield top. The extension strip 28 has its forward edge reinforced and stiffened by a bowed or U-shaped rod 29, which has its legs extending downward and rearward from a point in advance of the shield and attached at their ends to the respective side edge of the shield frame 5, as at 30, by screws or in any other suitable manner, as shown in Figs. 1 and 4. The rear edge of the extension strips 28 is drawn closely over the top 3 preferably at the rear of the front rib 4 by strips 31 which are attached to the rear edge of the extension strip near the ends thereof and are adapted to engage around the customary studs 32, which project from the upper front of the top sides. The window 7 is provided on the rear portion of the sides thereof with spring catches 33, which are adapted, when the window is raised, to engage over the looped portion of the bracket 22 and to hold the window in its raised position.

The front of the shield with the exception of the window opening 6 therein, has its front side covered by a waterproof cloth or other suitable material 34, which is intended to hang down in front of the dash 2. The open side spaces between the side edges of the shield and top are closed by curtains 35, which may be removably attached to the shield and top in any suitable manner. As the manner of attaching the material 34 and side curtains 35 to the respective parts forms no part of the present invention, it will not be specifically described.

In applying my improved storm shield to a vehicle the bars 12, which adjustably connect the lower ends of the standards 8, 8 are placed on the top edge of the vehicle body 1 in contact with the dash 2; and when the standards 8, 8 have been pivotally adjusted relative to the frame 5 on the pivots 9 to suit the width of the body (the bolts 10 being first removed for such purpose), the connecting bars 12 are securely clamped in adjusted relation to the dash 2 by the clamping blocks 17 and bolts 18. This being done, the upper ends of the standards 8, 8 are rigidly secured to the shield frame by the insertion of the bolts 10 through registering apertures 11 therein. The height of the shield with relation to the vehicle body, to suit the height of the top, is also regulated by placing the bolts 14, which connect the standards to the cross-bars 12, in desired apertures 15 in such standards. The brace arms 20 are then forced up under the front cross-rib 4 of the vehicle top, in contact therewith, by an adjusting of the nuts 25 on the bent end portions 23 of the U-shaped bracket 22, thus causing the brace-arms 20 to coact with the cross-rib 4 to prevent a forward movement of the shield relative to the top. The stop means 26—27 on each brace arm 20 is then adjusted to abut against the front side of the cross-rib 4 and secured in such position, whereby the top, when in raised position, serves to brace the shield against rearward movements relative thereto. The rear edge of the top extension strip 28 is then drawn rearward over the front edge of the top and drawn closely thereover by a tightening of the strips 31 around the top parts 32.

It is obvious that my improved shield is capable of being easily and quickly attached to or removed from a vehicle without the removal or loosening of any clamping bolts or other retaining means with the exception of the bolts 18, which serve to clamp the cross-bars 12, 12 to the dash, and that the top, while serving, when in raised position, to brace the top portion of the shield against forward or rearward movements relative to the body, can be freely lowered without disturbing the adjustment of the bracing connection between the top and shield. It is also evident that the standards 8, 8 are capable of being easily adjusted relative to the shield frame to vary the distance between the lower end portion thereof as the width of a vehicle body to which the shield is to be attached may require. When it is desired to place the shield in compact form for storing or shipping, the bent portions 23 of the bracket member 22 may be removed from the supporting brackets 24 and the bracket 22 and arms 20 then folded close to the frame in substantially longitudinal register, one with the other, due to the pivotal connection of the arms 20 both with the shield frame and with the bracket 22.

I wish it understood that my invention is not limited to any specific construction or arrangement of the parts except in so far as such limitations are specified in the claims.

Having thus described my invention, what I claim as new, and desire to secure by Letters Patent, is,—

1. The combination with a vehicle body and dash, of a storm shield frame, supporting standards pivotally attached to the lower side edge portions of said frame and having their upper ends extending above their pivots to adjacent to the upper portion of the frame, an adjustable connection between the lower end portions of said standards adapted to rest on the top edge of the vehicle body, and means for clamping said connection to the dash.

2. The combination with a vehicle body and dash, of a storm shield frame, supporting standards for said frame disposed adjacent to opposite side edges thereof and extending from near the top of the frame to a distance below the same and being pivoted to the lower portion of the frame for swinging movements to permit a varying of the space between the lower end portions thereof, means for adjustably securing the upper end portions of the standards to the frame, means carried by the lower end portions of said standards for lengthwise adjustment relative thereto and forming an adjustable connection between the standards adapted to rest on the top edge of the vehicle body, and clamping means carried by said connecting means for securing it to the dash.

3. A storm shield having a body frame, a bracing arm pivoted to and projecting rearwardly from the upper portion of said frame, a single-piece bracket member pivotally attached to said arm and attached to the frame to adjustably brace the arm relative thereto, said arm and bracket being foldable in compact form relative to the frame.

4. A shield of the class described having a body frame, arms pivoted to and projecting rearwardly from the upper portion of said frame, and a U-shaped bracket member having its loop journaled in said arms in spaced relation to their pivots and having its legs adjustably attached to the frame below the points of attaching of the arms thereto, whereby the bracket is capable of adjustment relative to the frame to vary the direction of projection of the arms therefrom.

5. In combination, a vehicle body and top, a shield mounted on and rising from the front portion of the vehicle body, means projecting from the rear side of the shield and having rearwardly inclined contact with the under side of the front edge of the top to coact therewith to prevent a forward tilting of the shield, said top being free to lower without disturbing the adjustment of said means relative to the shield, and means carried by said first means and freely abutting against said top to prevent a rearward tilting movement of the shield relative to the top.

6. In combination, a vehicle body and top, a storm shield mounted on and rising from the front portion of the body, and means foldably carried by the shield and adjustable to bear up against the under side of the front portion of the top on a rearward incline to brace the shield against forward movements relative to the top, and having an adjustable part for coacting with the front edge of the top to brace the shield against rearward movements relative thereto.

7. In combination, a vehicle body and folding top, a storm shield rising from the front portion of the body, arms pivotally projecting from the rear side of the shield beneath the front portion of the top in rearward inclined contact therewith, a U-shaped bracket member pivotally attached to said arms and adjustably attached to the shield to adjust the inclination of the arms and hold them in adjusted position whereby the arms coact with the front portion of the top to prevent a forward movement of the shield relative thereto, and means adjustable on said arms for coacting with the front edge of the top to coöperate therewith to brace the shield against rearward movements relative to the top when the top is in raised position, said top being capable of having rearward folding movements relative to the shield without disturbing the adjustment of said arms and means.

8. In combination, a vehicle body and top, a storm shield rising from the front portion of the body, means projecting rearwardly from the shield and loosely coacting with the front portion of the top to brace the shield against movements relative thereto, a window hinged to the shield for vertical opening movements, and means carried by the window for coacting with said means to hold the window in raised position.

9. A storm shield of the class described having a body frame, an arm pivoted to and projecting rearwardly from the upper portion of said frame, an apertured bracket fixed to said frame below the pivot of said arm and a second arm pivoted to the first arm in spaced relation to its pivot and extending downwardly and forwardly from its point of pivotal connection with said first arm, the forward end of said second arm being projected through the aperture of said bracket, and means for adjusting said second arm relative to the bracket to vary the inclination of said first arm.

In testimony whereof, I have hereunto signed my name to this specification in the presence of two subscribing witnesses.

CHARLES F. WENSINGER.

Witnesses:
S. T. KLOTZ,
C. W. OWEN.

Copies of this patent may be obtained for five cents each, by addressing the "Commissioner of Patents, Washington, D. C."